Aug. 25, 1936.                H. R. TEAR                2,052,119
                           MOTOR VEHICLE LIFT
                        Original Filed March 20, 1931

INVENTOR.
HARRY R. TEAR.
BY
ATTORNEY

Patented Aug. 25, 1936

2,052,119

UNITED STATES PATENT OFFICE 2,052,119

MOTOR VEHICLE LIFT

Harry R. Tear, Evanston, Ill., assignor to The Lubrication Corporation, Chicago, Ill., a corporation of Delaware Original application March 20, 1931, Serial No. 524,069. Divided and this application July 11, 1934, Serial No. 734,591. Renewed October 9, 1935

10 Claims. (Cl. 254—89)

This invention relates to improvements in motor vehicle lifts and more particularly to safety devices or chocks for preventing a vehicle from rolling off the track of the lift during that time which the track is elevated.

This application is a division of my co-pending application Serial No. 524,069, filed March 20, 1931, entitled "Automobile lift safety devices".

The object of my invention is to provide an improved chock for motor vehicle lifts which is entirely automatic in operation.

A further object is to provide a simple, inexpensive chock as described which will be positive in operation, which will always be in operative position when the lift is raised a short distance from the ground or support, and which will always be in inoperative position when the lift is on the ground.

Other objects, the advantages and uses of the invention, will become apparent after reading the following description and claims and after consideration of the drawing forming a part of this specification.

In accomplishing these objects I utilize a pivoted chocking member associated with the vertically movable track of the lift in such a manner that contact with the ground renders it inoperative and the action of gravity brings it into operative position when the track is raised above the ground.

The invention will be more clearly understood from the following detailed description of different embodiments thereof.

This invention is applicable to any type of motor vehicle lift having a track, upon which the vehicle is supported, but by way of example I have shown herein a lift comprising a piston 10 which is adapted to be actuated by fluid pressure in a cylinder (not shown), suitable structural elements 11, including steel channels and angles for supporting the track 12 upon the upper end of the piston 10, and reinforcing flanges 13 on both sides of the track 12 to prevent the automobile from lateral displacement when upon the track. At one end of the track I have shown a suitable rod or flange 13A extending across the track to prevent the automobile from rolling off.

Figure 2:
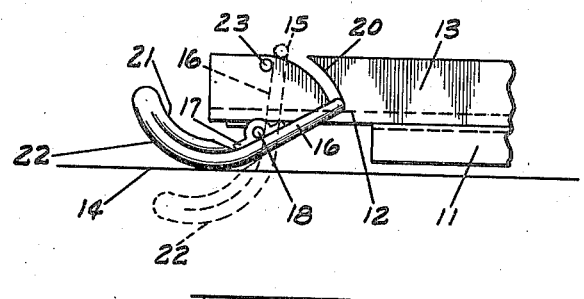
Figure 2 is a fragmentary side elevation of one end of the lift track illustrating the automatic chock in detail.
Figure 3:
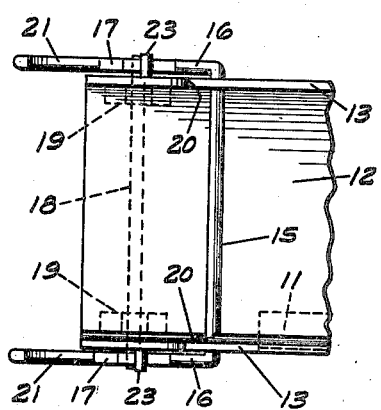
Figure 3 is a top plan view of the device of Figure 2.

With reference particularly to Figs. 2 and 3, I have illustrated at the free end of the track my improved automatic chock in that position which it occupies when the track is lowered to the limit of its downward travel and in dotted lines in Fig. 2 I have indicated the position of the movable element of the chock assumed when the track is elevated so that the outer portion of the element is free of engagement of the ground or other supporting surface represented at 14. In the embodiment shown, the chock comprises a rod 15 having parallel and laterally extending arms 16 at opposite ends thereof at a distance apart from one another slightly greater than the distance between the outer faces of the flanges 13. The rod 15 may be pivotally mounted upon the end of the track 12 through the medium of bearing members 17 fixed to the arms 16 of the rod which are engageable with the opposite ends of a pivot rod 18, fixed, as by the cleats 19, to the lower surface of the track 12. The bearing members 17 are preferably located so as to permit the mid-portion of the rod 15 to rise upwardly above the top surface of the track 12 a distance substantially equal to the height of the flanges 13 when the chock is in the dotted line position indicated in Fig. 2. In order that the rod 15 may move throughout the range of movement indicated by the full and dotted line positions of Fig. 2 about the axis of the pivot rod 18 an arcuate slot 20 may be formed in each of the flanges 13 as shown.

Figure 1:
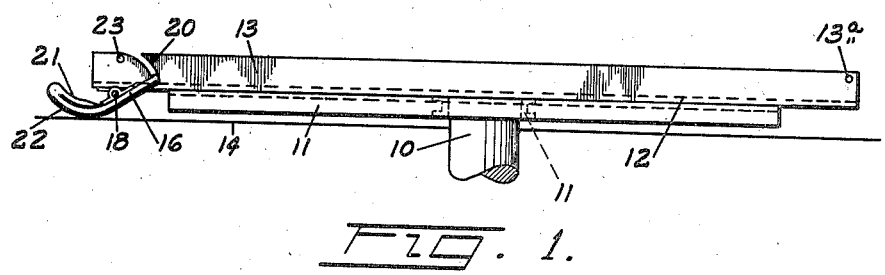
Figure 1 is a side elevation of a motor vehicle lift embodying an automatic chock constructed in accordance with the invention.

Over-balancing means for the chock may be provided by folding back a portion of the ends of the arms 16, as indicated at 21, thus to provide increased weight upon that side of the axis of the pivot rod 18 extending away from the track and to assure the chock assuming the dotted line position of Fig. 2 under force of gravity when the track is elevated. The outer or folded portions of the arms 16 may be curved upwardly as shown in Figs. 1 and 2 to present curved surfaces 22, thereby to enable free movement of the chock to its full line position when the lift is lowered to cause the aforesaid outer ends of the arms 16 to engage with the ground or supporting surface 14. Stop pins 23 may be located upon the outer walls of the flanges 13 to limit the pivotal movement of the chock under force of gravity to the dotted line position of Fig. 2 during elevation of the lift. If desired, however, the pins 23 may be eliminated, in which event the unslotted portions of the flanges 13 will effectively serve to preclude further pivotal movement of the chock.

When the lift is in the position indicated in Fig. 1 a vehicle may be driven upon the track 12 since the horizontally extending or mid-portion of the rod 15 is caused to lie directly upon the upper surface of the track. Elevation of the track will result in the disengaging of the end portion of the arms 16 of the chock rod from the ground or support 14, thereby to cause the chock to assume the dotted line position shown in Fig. 2 under the force of gravity acting thereupon, the horizontal or mid-portion of the chock rod being elevated to a position substantially level with the top of the side flanges 13 and, therefore, in the path of movement of a vehicle upon the lift track.

While I have described in detail a specific embodiment of my invention, it is to be understood that I do not limit myself to such details except as set forth in the following claims.

I claim:

1. In a motor vehicle lift, a vertically movable track for supporting a motor vehicle thereupon, and an automatic chock mounted at one end of said track, said chock including a rod having its mid-portion lying parallel with and over the vehicle supporting surface of the track and its end portions bent laterally and in a direction substantially parallel to and away from the longitudinal center of the track and disposed adjacent the outer side walls respectively of the track, pivotal connections between each of the laterally bent portions of said rod and the track, and counterweight means on the outermost ends of the said rod beyond said pivotal connections thereby normally to lift the mid-portion of the rod upwardly and away from said track surface.

2. In a motor vehicle lift, a vertically movable track for supporting a motor vehicle thereupon, and an automatic chock mounted at one end of said track, said chock including a rod having its mid-portion lying parallel with and over the vehicle supporting surface of the track and its end portions bent laterally and in a direction substantially parallel to and away from the longitudinal center of the track and disposed adjacent the outer side walls respectively of the track, pivotal connections between each of the laterally bent portions of said rod and the track, counterweight means on the outermost ends of the said rod beyond said pivotal connections thereby normally to lift the mid-portion of the rod upwardly and away from said track surface, and stop means carried by said track for limiting the pivotal movement of said chock rod under the action of said counterweight means to restrain movement of the chock rod by the rolling of a vehicle, when upon the track, against said chock rod.

3. In a motor vehicle lift, a vertically movable track for supporting a motor vehicle thereupon, and an automatic chock mounted at one end of said track, said chock including a rod having its mid-portion lying parallel with and over the vehicle supporting surface of the track and its end portions bent laterally and disposed adjacent the outer side walls respectively of the track, pivotal connections between each of the laterally bent portions of said rod and the track, and counterweight means on the outermost ends of the said rod beyond said pivotal connections thereby normally to lift the mid-portion of the rod upwardly and away from said track surface, the counterweighted portions of said rod being so arranged, with respect to the mid-portion of the rod and said pivotal connections, as to engage with the ground when said track is lowered thus positively to urge the mid-portion of the rod downwardly upon said track surface.

4. In a motor vehicle lift, a vertically movable track, and an automatic chock mounted upon one end of said track including a U-shaped rod having the arms thereof pivotally mounted intermediate their lengths upon opposite sides of said track with the free ends of the rod extending away from the track and the mid-portion of the rod located above and over the surface of the track, counterweight means on said free ends of the rod arms, and a stop associated with the track and with said rod for limiting the pivotal movement of the rod under force of gravity acting upon said counterweight means.

5. In a motor vehicle lift, a vertically movable track, and an automatic chock mounted upon one end of said track including a U-shaped rod having the arms thereof pivotally mounted intermediate their lengths upon opposite sides of said track with the free ends of the rod extending away from the track and the mid-portion of the rod located above and over the surface of the track, the outer ends of said rods being folded back to provide counterweight means for said rod, and a stop associated with the track and with said rod for limiting the pivotal movement of the rod under force of gravity acting upon said counterweight means, the ends of said rod arms being engageable with the ground when said track is lowered thereby to cause the mid-portion of the rod to lie upon the said surface of the track.

6. In a motor vehicle lift, a vertically movable track, and an automatic chock mounted upon one end of said track, said chock including a U-shaped bar having the arms thereof pivotally mounted intermediate their lengths upon opposite sides of said track with the free ends of the bar extending toward and beyond the end of said track, counterweight means on said ends of said bar, the mid-portion of the bar extending transversely of and above the vehicle tread surface of said track in such manner that as the bar swings about its pivotal axis the said mid-portion will rise into the path of a wheel of a vehicle upon the track to prevent the wheel from rolling to the end of said track, and a fixed stop to limit the movement of the bar under the influence of said counterweight means and also to limit the movement of the bar under the influence of said vehicle wheel.

7. In a motor vehicle lift, a vertically movable track having a vertically extending wall at one side thereof to prevent lateral displacement of a vehicle wheel when upon the track, and an automatic chock mounted upon one end of said track including a U-shaped rod having the arms thereof pivotally mounted intermediate their length upon opposite sides of said track with the free ends of the rod extending away from the track and the mid-portion of the rod extending above and over the surface of the track, said vertically extending track wall having a slot therein, through which the rod extends and within which the rod may move, and counterweight means on said free ends of the rod arms.

8. In a vehicle lift, a vertically movable track for supporting a vehicle thereupon, and an automatic chock mounted adjacent to one end of said track, said chock comprising, a rod projecting over the vehicle supporting surface of the track and in the path of a vehicle wheel disposed on said surface, a rigid arm secured to said rod and extending in a direction substantially parallel to and away from the longitudinal center of the track, means providing a pivotal connection between said arm and the track, said arm being overbalanced relative to said rod about said pivotal connection thereby normally to lift said rod upwardly and away from said track surface as the track is raised, and the outermost end of the rod arm being so arranged as to engage with the ground when the track is lowered thus positively to urge the rod downwardly toward the track surface.

9. In a motor vehicle lift having a vertically movable track with a vertically extending wall at one side thereof to prevent lateral displacement of a vehicle wheel when on the track, an automatic chock mounted adjacent to one end of the track comprising a rod lying parallel with and over the wheel supporting surface of the track and an extension secured to said rod and pivoted intermediate its ends at one side of the track with its free end extending in a direction substantially parallel to and away from the longitudinal center of the track, said vertically extending wall having a slot therein through which said rod extends and the free end of the extension being weighted thereby normally to urge said rod upwardly and away from the track surface.

10. In a motor vehicle lift having a vertically movable track with a vertically extending wall at one side thereof to prevent lateral displacement of a vehicle wheel when on the track, an automatic chock mounted adjacent to one end of the track comprising a rod lying parallel with and over the wheel supporting surface of the track and an extension secured to said rod and pivoted intermediate its ends at one side of the track with its free end extending in a direction substantially parallel to and away from the longitudinal center of the track, said vertically extending wall having a slot therein through which said rod extends and the free end of the extension being weighted thereby normally to urge said rod upwardly and away from the track surface, and a stop carried by the track to limit upward movement of the rod.

HARRY R. TEAR.